United States Patent
Velusamy et al.

(10) Patent No.: US 9,531,554 B1
(45) Date of Patent: Dec. 27, 2016

(54) DEFAULT QUOTA IMPLEMENTATION FOR WIRELESS DEVICES

(71) Applicant: Sprint Communications Company L.P., Overland Park, KS (US)

(72) Inventors: Saravana Velusamy, Olathe, KS (US); Pierce Andrew Gorman, Lee's Summit, MO (US); Nicolas A. Nehme Antoun, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 226 days.

(21) Appl. No.: 14/170,003

(22) Filed: Jan. 31, 2014

(51) Int. Cl.
*H04L 12/16* (2006.01)
*H04L 12/14* (2006.01)
*H04W 4/26* (2009.01)

(52) U.S. Cl.
CPC ............ *H04L 12/1414* (2013.01); *H04W 4/26* (2013.01)

(58) Field of Classification Search
USPC ......... 370/259–352, 389–401; 455/405–450; 709/201–229
See application file for complete search history.

(56) References Cited

U.S. PATENT DOCUMENTS

| | | | |
|---|---|---|---|
| 7,599,478 B2 * | 10/2009 | Cai et al. ................ | 379/114.21 |
| 8,116,728 B2 | 2/2012 | Cai et al. | |
| 8,818,327 B2 * | 8/2014 | Shaikh ........... | 455/405 |
| 2011/0075675 A1 | 3/2011 | Koodli et al. | |
| 2013/0148668 A1 * | 6/2013 | Kean et al. ............. | 370/401 |
| 2013/0173717 A1 * | 7/2013 | Subramanian et al. ...... | 709/206 |
| 2013/0231080 A1 * | 9/2013 | Cheuk et al. ............ | 455/405 |
| 2014/0075029 A1 * | 3/2014 | Lipchuk et al. ........... | 709/226 |

FOREIGN PATENT DOCUMENTS

WO 2013121208 8/2013

* cited by examiner

*Primary Examiner* — Man Phan

(57) ABSTRACT

Examples disclosed herein provide systems, methods, and software for implementing default data quotas for wireless devices. In one example, a packet data network gateway is configured to identify a communication for a wireless device and transfer a quota query for the wireless device to an online charging server. The packet data network gateway is further configured to receive actual and default quota information from the online charging server and implement the default quota information when the communication link between the gateway and the online charging server is interrupted.

16 Claims, 3 Drawing Sheets

US 9,531,554 B1

DEFAULT QUOTA IMPLEMENTATION FOR WIRELESS DEVICES

TECHNICAL BACKGROUND

Wireless communication systems typically include wireless access systems with equipment such as wireless access nodes along with various control and routing nodes that provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless devices, service providers, and other end user devices. The user communications typically include voice calls, data exchanges, web pages, streaming media, or text messages, among other communication services.

In some examples, an online charging server or OCS may monitor the data connections for the wireless devices. The OCS is a system that allows communication service providers to charge their customers, in real time, based on service usage. To accomplish this task, the wireless communication must be consistently monitored to ensure that the user is permitted to use the requested amount of data. If the user is out of data, then the OCS can be used to terminate the communication and prevent the device from joining the network.

In at least one instance of an OCS, the OCS is connected to the packet data network gateway (PGW) used in providing service to the wireless communication device. This PGW may periodically query the OCS using a Gy interface to determine whether the device is allowed to connect to the network. In some examples, the OCS will provide the PGW with a quota indicating an amount of data the user has available. Once the user consumes this quota, the PGW may continue to inquire the OCS for further quota information until the communication is complete or the user has exhausted the total available communication data.

Overview

Examples disclosed herein provide systems and methods for implementing a default data quota for a wireless device. In one example, a method for operating a packet data network gateway includes transferring a quota request for delivery to an online charging server in response to a communication requirement for a wireless device, and receiving default quota information and actual quota information from the online charging server regarding the wireless device. The method further includes identifying a communication interruption between the packet data network gateway and the online charging server and, in response to the communication interruption, implementing the default quota information for the wireless device.

In another instance, a system for implementing default quotas for wireless devices includes a packet data network gateway configured to transfer a quota request for delivery to the online charging server in response to a communication requirement for a wireless device, and receive default quota information and actual quota information from the online charging server regarding the wireless device. The packet data network gateway is further configured to identify a communication interruption between the packet data network gateway and the online charging server, and implement the default quota information for the wireless device responsive to the communication interruption.

The system further includes the online charging server configured to receive the quota request and identify the default quota information and the actual quota information. Once the quota information is identified, the online charging server is configured to transfer the default quota information and the actual quota information for delivery to the packet data network gateway.

In another example, a computer apparatus to facilitate default quota implementation includes processing instructions that direct a packet data network gateway computing system to transfer a quota request for delivery to an online charging server in response to a communication requirement for a wireless device. The processing instructions also direct the computing system to receive default quota information and actual quota information from the online charging server regarding the wireless device, and identify a communication interruption between the packet data network gateway and the online charging server. The processing instructions further direct the computing system to implement the default quota information responsive to the communication interruption. The computer apparatus further includes one or more non-transitory computer readable media that store the processing instructions.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Wireless devices provide a variety of applications to users that require data communications using wireless networks. These applications may include voice applications, email applications, gaming applications, file sharing applications, or a variety of other applications. When a communication is required, the wireless device may communicate with a wireless access node that will in turn communicate to a packet data network gateway or PGW. Once the requested communication is identified, the PGW may request an online charging server (OCS) for a data quota for the user device.

In some examples, the online charging server will periodically query the PGW for quota information. During these queries, the online charging server returns that a predetermined quota of data still remains on the user account. Once the device uses this quota, the PGW may again query the charging server for another quota. This process may repeat as many times as necessary until the communication is completed, or the user device exhausts the allotted amount of data in the charging server.

Although the PGW and the online charging server are configured to be in constant communication, there may be times where the communication between the two devices is interrupted. As a result, the PGW may no longer be able to gather the quotas for the plurality of user devices that require a communication. To assist with this issue, the present disclosure suggests that the online charging server may transfer default data quota information in addition to the actual data quota for the user account. This default quota may then be used by the PGW when the communication link between the PGW and the online charging server is interrupted.

In some examples, the default quota is based on a quality of service for the user device. Thus, if the user pays for a higher quality of service or has consistently paid their bills, the default quota may be higher than someone who pays for a lower quality of service or does not pay their bills. Further, because the length of the interruption may be unknown, the default quota may be configured to adjust over time. Accordingly, each device may be assigned a certain amount of data for a first period of time, but may be allocated further data for a second period of time if the charging server is still unavailable.

Once the PGW and the online charging server reestablish communications, the PGW may update the online charging server to reflect the data usage of the various user devices. By allowing a default data quota for the user devices, the wireless provider is able to continue user communications despite portions of the system being down or inoperable.

Figure 1:
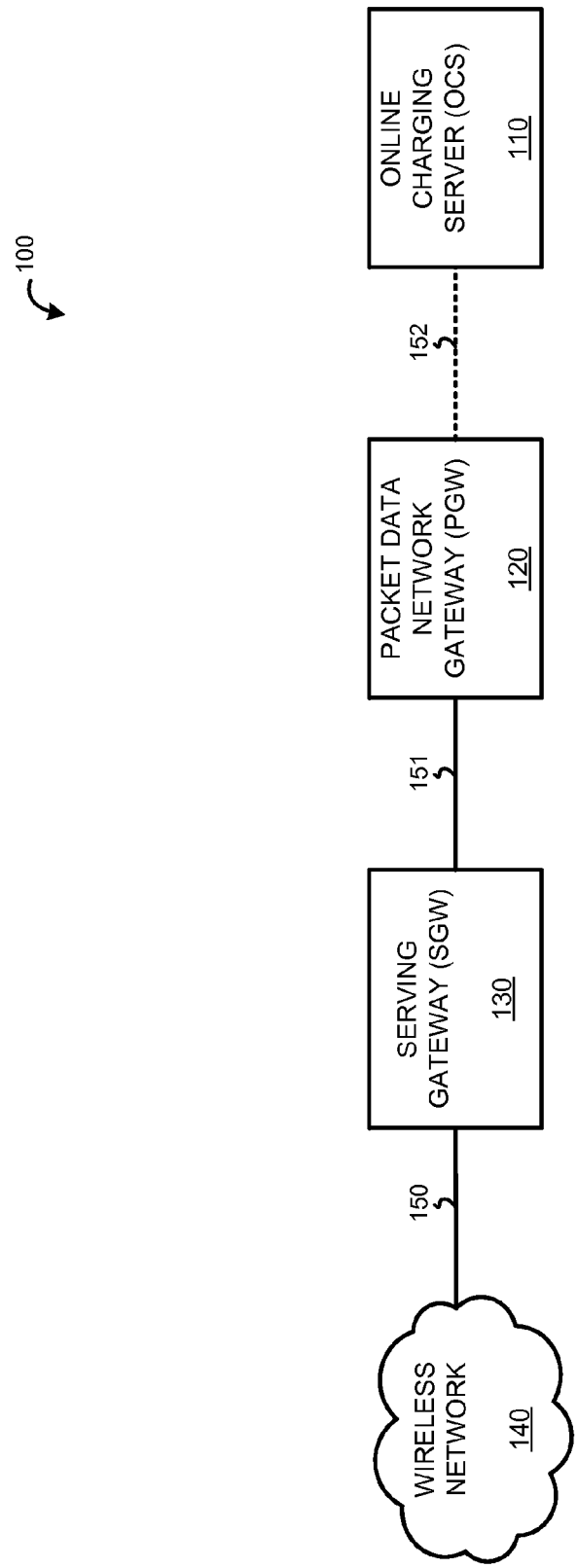
FIG. 1 illustrates a charging system for providing default quotas.

To further illustrate the implementation of a default quota, FIG. 1 is included. FIG. 1 illustrates a charging system 100 for providing default quotas to a packet data network gateway. Charging system 100 includes online charging server (OCS) 110, packet data network gateway (PGW) 120, serving gateway (SGW) 130, and wireless network 140. Wireless network 140 is configured to communicate with SGW 130 over communication link 150. PGW 120 communicates with SGW 130 over communication link 151, and further communicates with OCS 110 over communication link 152.

In operation, one or more wireless devices may require wireless communications with access nodes in wireless network 140. These communications may serve a variety of applications on the wireless devices, including email applications, gaming applications, Internet browsing applications, or any other application that requires a data communication. Once the wireless communications are identified, the devices will communicate over wireless network 140 and SGW 130 to PGW 120.

PGW 120 is configured act as an interface between the communication network, and the other packet data networks, such as the Internet or SIP-based IMS networks. In the present example, PGW 120 is configured to monitor the billing and the available services for the wireless devices, and ensure the devices are permitted to make the required communications. To accomplish this task, PGW 120 communicates a quota request over Gy interface communication link 152 to OCS 110. This quota request is used by PGW 120 to determine if the wireless devices are able to join the network.

In response to the requests from PGW 120, OCS 110 is configured to return quotas for the devices that are attempting to use the network. In some examples, each device may be connected to a user or group account that provides the amount of data or service that is allotted for the device. As a result, OCS 110 may be configured to respond to the PGW request with a quota that comprises at least a portion of the allotted data.

In some examples, this quota may be a predefined segment of the available data, such as a megabyte or any other unit of measure. Once the device has exhausted this segment, PGW 120 may re-inquire OCS 110 to determine if another segment is available. This process may then be repeated until the communication on the wireless device is complete, or until the device has run out of available data.

Figure 2:
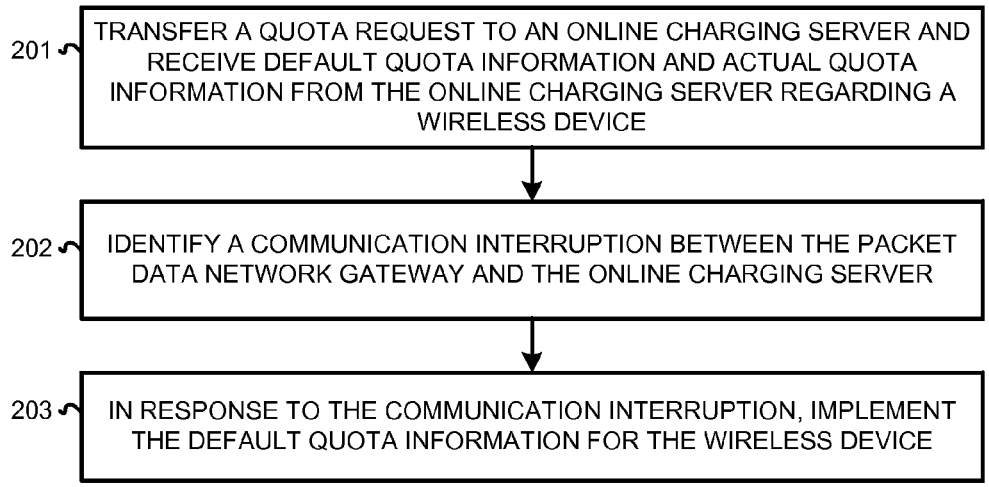
FIG. 2 illustrates a method of operating a packet data network gateway to implement default quotas.

Turning now to FIG. 2, FIG. 2 illustrates a method of operating a packet data network gateway, such as PGW 120 to implement default quotas. As discussed above for system 100, PGW 120 may be configured to request quotas for wireless devices that are attempting to communicate over the communication network. In response to these requests, OCS 110 may identify a quota for the device based on the corresponding account and return the quota to PGW 120. In addition, OCS 110 may also be configured to identify a default quota for the device, which allows a fail safe if communication link 152 were to be interrupted.

In some examples, this default quota may be based on a quality of service, which may be based on the type of service the end user has selected, the on-time payment habits of the end user, or any other factor to determine a quality of service. Once the default quota is determined, the actual quota and the default quota may be transferred to PGW 120 to be implemented for the wireless device.

Referring still to FIG. 2, the method of operating PGW 120 includes transferring a quota query to OCS 110 for connecting wireless devices and receiving the default quota information and the actual quota information for the devices (201). Once received, PGW 120 will implement the actual quotas that will allow the devices to communicate using the available data in the associated accounts. During these communications, PGW 120 is further configured to identify a communication interruption between PGW 120 and OCS 110 (202). This interruption could come from a variety of factors, including the shut of OCS 110, an interruption on communication link 152, or any other method of interrupting the communication between PGW 120 and OCS 110. In response to the interruption, PGW 120 is also configured to implement the default quota information for any connected wireless devices (203).

During routine operation of PGW 120, PGW 120 is configured to allow a wireless device to communicate until the provided quota exhausted. Upon exhaustion of the quota, PGW 120 may communicate another quota request to OCS 110 to gather a subsequent quota for the wireless device. This process may then be repeated as many times as necessary until either the communication is complete or the user has exhausted the allotted account data.

In contrast to the routine operation, if PGW 120 identifies that it can no longer communicate with OCS 110, PGW 120 will implement the default quotas for the connected wireless devices. These default quotas allow PGW 120 to provide communications to the wireless devices without retrieving additional quotas from OCS 110. Instead, the default quotas will be provided to the user devices based on quality of service and provide the user with a certain amount of data over a period of time. Take for example, a user that has a high quality of service and is communicating using PGW 120 when the communication link with OCS 110 is interrupted. Because of the high quality of service, the default data quota will be set to a higher amount than other devices with a lower quality of service.

In some examples, the default quota may be set for a certain period of time as well as for a certain amount of data. Accordingly, once the wireless device has used up the quota, the device may be unable to communicate until the time period expires. Once expired, PGW 120 may assign a new default quota for the next time period, and continue assigning new quotas until communication with OCS 110 can be reestablished.

In some instances, the default quotas for the wireless devices may change over time. As a result, a wireless device may be a given an initial quota for a first time period, but that quota may shrink for the following time periods. This adjustment allows PGW 120 to more accurately reflect what would likely happen if the actual quotas were still being gathered from OCS 110. Further, once the communication link is reestablished between OCS 110 and PGW 120, the amount of data used by the wireless devices during the interruption may be communicated to OCS 110. This data may be used by OCS 110 to update the data available to the users when they require future communications.

Figure 3:
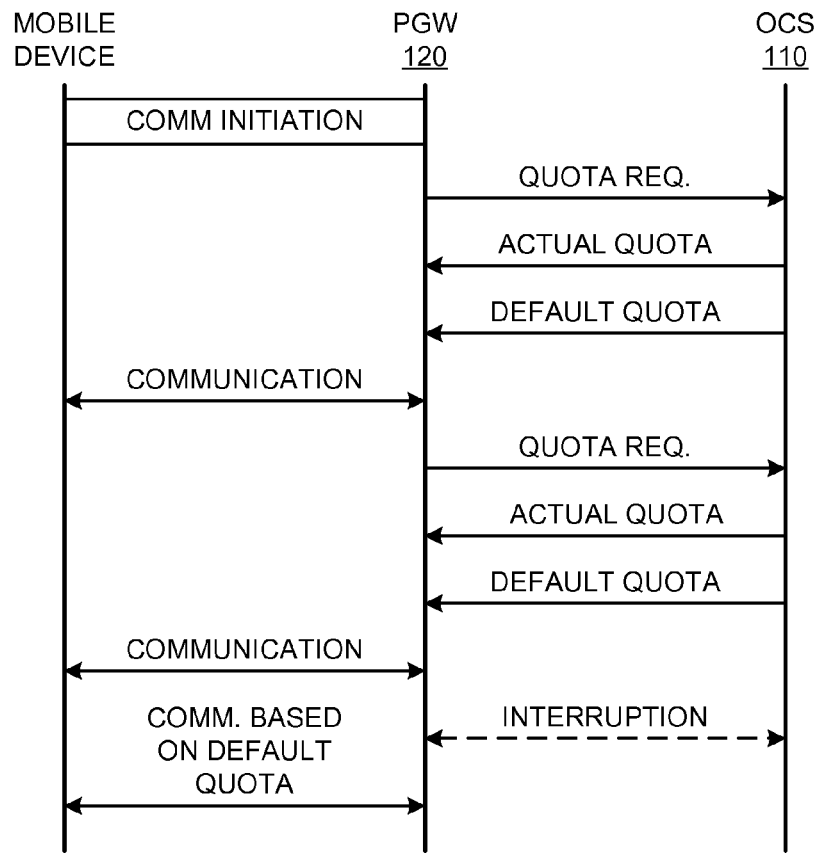
FIG. 3 illustrates a timing diagram for implementing default quotas from an online charging server.

To further illustrate the operation of system 100 FIG. 3 is included. FIG. 3 illustrates a timing diagram for implementing default quotas in a packet data network gateway. In operation, a wireless device may communicate over a wireless network, such as wireless network 140, with PGW 120. PGW 120 allows the device to connect to other wireless devices and data systems over the Internet or other networks. Once a connection is requested for the wireless device, PGW 120 will make a quota request to OCS 110 over a Gy interface. The quota request is used by PGW 120 to ensure that the wireless device is permitted to make the communication.

In response to the quota request, OCS 110 will check the available resources for the device and determine an actual quota based on the data available. In some examples, the actual quota may be a predetermined portion of the available data for the device. For instance, if the wireless device has one gigabyte of data available, the actual quota returned by OCS 110 may include a fragment or portion of that data. Once the actual quota is exhausted in the communication, PGW 120 can inquire OCS 110 for another actual quota based on the remaining data for the wireless device.

Although PGW 120 prefers to use the actual quota in determining whether the mobile device is permitted to make a communication, OCS 110 is also configured to pass a default quota in response to the quota request. PGW 120 uses the default quota when the Gy communication path is interrupted, allowing communications to continue without verifying that data is available for the end user.

Referring still to FIG. 3, PGW 120 is configured to initially allow the communication using the actual quota provided by OCS 120 until that quota has been consumed. Upon consumption of the quota, PGW 120 will transfer a second quota request to OCS 110 to determine if further data is available for the wireless device. Responsive to the request, OCS 110 will return actual quota information and default quota information so long as the device is permitted to communicate on the network. In normal operation, this process is repeated as many times as necessary until the communication is terminated or the device has liquidated the available data. However, if the interface between PGW 120 and OCS 110 is interrupted during the wireless devices communication, PGW 120 may no longer be able to gather the actual quota from OCS 110.

Accordingly, as illustrated in FIG. 3, PGW 120 is configured to implement the default quota with respect to the mobile device. This default quota is based on a quality of service, and may allocate a specified amount of data over a period of time to prevent the mobile device communication from terminating when the Gy interface interruption occurs. Once the mobile device uses the default allocated data, the device may be prevented from communicating until the default period of time has expired. Upon expiration of the period of time, the mobile device may be allocated a new amount of data for the next period of time. This process of implementing the default quota may be repeated until the Gy interface is reestablished and actual quota information can be gathered for the connected wireless devices.

Figure 4:
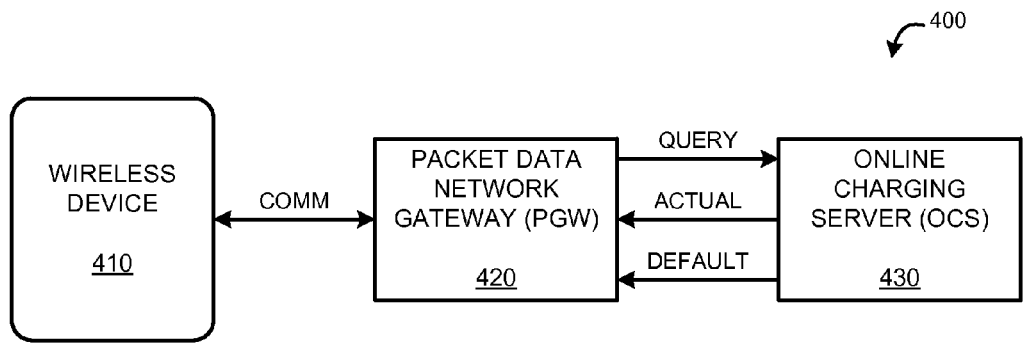
FIG. 4 illustrates an overview for implementing default quotas from an online charging server.

Referring now to FIG. 4, FIG. 4 illustrates an overview 400 for implementing default quotas from an online charging server. Overview 400 includes wireless device 410, packet data network gateway (PGW) 420, and online charging server (OCS) 430. In operation, an application on wireless device 410 may require a communication that uses PGW 420. Such applications may include voice applications, email applications, file-sharing applications, streaming applications, or any other data application.

Once PGW 420 recognizes the communication, PGW 420 will transfer a quota request for delivery to OCS 430 to determine if wireless device 410 is permitted to make the communication. In response to the query, OCS 430 will determine actual quota information and default quota information for the wireless device. The actual quota information is representative of an actual portion of data available to the wireless device. For example, wireless device 410 may be allotted a certain amount of data that is either purchased or distributed through other means. OCS 430 is configured to take a portion of this allotted data and provide the portion to PGW 420 as actual quota information. Responsive to this portion of data, PGW 420 is configured to allow wireless device 410 to communicate until either the portion has been used or the communication is complete. If the portion has been used, but the communication is still required, PGW 420 may transfer subsequent queries to retrieve new actual quota information for wireless device 410, until the communication is complete.

In contrast to the actual quota information, the default quota information is used when the link between PGW 420 and OCS 430 is interrupted. As such, the default quota does not reflect the actual allotted data that remains for the user, but is based on a quality of service that the device has been assessed. This quality of service may be based on payment tiers for the wireless device, the frequency that the user of the wireless device has paid the bills, or any other quality of service determination. In some examples, the default quota identifies an amount of data that a wireless device is allowed for a certain period of time. Once the allotted amount of data is consumed, the device may be blocked from further communication or given a new default quota. In the instances where the device becomes blocked, once the time period has elapsed, the device may be designated another default quota that may be the same or adjusted based on the downtime of the Gy link. This process of assigning default quotas may continue until the communication link between PGW 420 and OCS 430 is reestablished.

Figure 5:
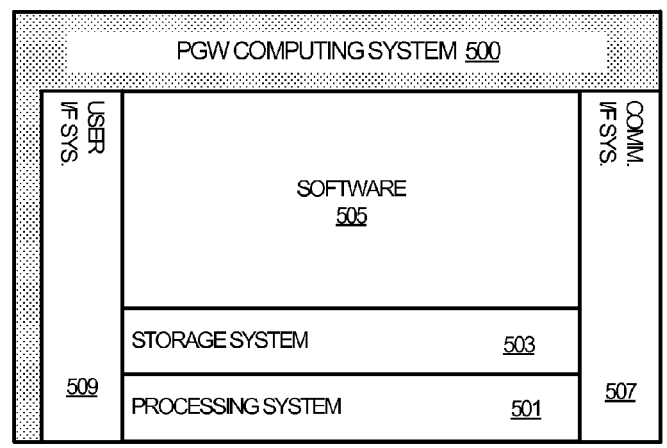
FIG. 5 illustrates a gateway computing system for implementing default quotas from an online charging server.

Turning now to FIG. 5, FIG. 5 illustrates a PGW computing system 500 for implementing default quota information. PGW computing system 500 is representative of a computing system that may be employed in any computing apparatus, system, or device, or collections thereof, to suitably implement PGW 120 or PGW 420. Computing system 500 may be employed in server computers, data centers, any physical or virtual computing machine, and any variation or combination thereof. In addition, computing system 500 may be employed in desktop computers, laptop computers, or the like.

Computing system 500 includes processing system 501, storage system 503, software 505, communication interface system 507, and user interface system 509. Processing system 501 is operatively coupled with storage system 503, communication interface system 507, and user interface system 509. Processing system 501 loads and executes software 505 from storage system 503. When executed by processing system 501, software 505 directs processing system 501 to operate as described herein as a packet data network gateway to implement default quotas for wireless devices. Computing system 500 may optionally include additional devices, features, or functionality not discussed here for purposes of brevity.

Referring still to FIG. 5, processing system 501 may comprise a microprocessor and other circuitry that retrieves and executes software 505 from storage system 503. Processing system 501 may be implemented within a single processing device, but may also be distributed across multiple processing devices or sub-systems that cooperate in executing program instructions. Examples of processing system 501 include general-purpose central processing units, application specific processors, and logic devices, as well as any other type of processing device, combinations, or variation.

Storage system 503 may comprise any computer readable storage media readable by processing system 501 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations storage system 503 may also include communication media over which software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 501 or possibly other systems.

Software 505 may be implemented in program instructions and among other functions may, when executed by processing system 501, direct processing system 501 to operate as a PGW described herein by FIGS. 1-4. In particular, the program instructions may include various components or modules that cooperate or otherwise interact to carry out the quota operations described in FIGS. 1-4. The various components or modules may be embodied in compiled or interpreted instructions or in some other variation or combination of instructions. The various components or modules may be executed in a synchronous or asynchronous manner, in a serial or in parallel, in a single threaded environment or multi-threaded, or in accordance with any other suitable execution paradigm, variation, or combination thereof. Software 505 may include additional processes, programs, or components, such as operating system software, hypervisor software, or other application software. Software 505 may also comprise firmware or some other form of machine-readable processing instructions executable by processing system 501.

For example, if the computer-storage media are implemented as semiconductor-based memory, software 505 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 500 is generally intended to represent a system on which software 505 may be deployed and executed in order to implement a PGW system from FIGS. 1-4 (or variations thereof). However, computing system 500 may also be suitable for any computing system on which software 505 may be staged and from where software 505 may be distributed, transported, downloaded, or otherwise provided to yet another computing system for deployment and execution, or yet additional distribution.

In one example, a wireless device may initiate a communication that requires the use of PGW computing system 500. To process the communication, computing system 500 may first identify whether the device has permission to make the corresponding communication. To accomplish this task, communication interface system 507 may first transfer a quota query for delivery to an online charging server that manages service usage by wireless customers.

In response to the query, the online charging server is configured to return actual quota information and default quota information corresponding to the communicating wireless device. Actual quota information is used by PGW computing system 500 to provide service to the wireless device based on actual values within the device account. For example, a device may have an account with a certain amount of allocated data on the online charging server. In response, to a quota query from a PGW computing system, the online charging server may take a predetermined portion or segment of that data and transfer that amount to the PGW for use by the wireless device. Once the device has used up the actual quota, PGW computing system 500 may send another quota inquiry to the online charging server to identify if more data is available.

In contrast to the actual quota information, the default quota information is used by PGW computing system 500 when the communication link between computing system 500 and the online charging server is interrupted. When such an occasion occurs, instead of gathering new actual quotas for the wireless device to continue the communication, computing system 500 will implement constraints based on the default quota information. In some examples, the default quota information defines a default amount of data per time that should be allotted to each device. This amount of data may be based on a variety of factors, including a quality of service that is selected by the user of the device, the bill paying habits of the user of the device, or any other quality of service determination for the wireless device.

Once the connection is reestablished with the online charging server, PGW computing system 500 may be configured to update the accounts on the server based on the amount of data used. In some examples, the default quota information may be configured to adjust depending on the length of the interruption. Accordingly, devices may be given an original default quota that decreases over the length of the interruption.

Referring still to FIG. 5, communication interface system 507 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface system 509, which may be omitted in some examples, may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here. User interface system 509 may also include associated user interface software executable by processing system 501 in support of the various user input and output devices discussed above. Separately or in conjunction with each other and other hardware and software elements, the user interface software and devices may support a graphical user interface, a natural user interface, or any other suitable type of user interface.

Returning to FIG. 1, online charging server (OCS) 110 may comprise any physical or virtual computing system with the ability to determine actual and default quota information for wireless devices. OCS 110 may include processing systems, user interfaces, communication interfaces, storage systems, or other similar computing elements.

PGW 120 and SGW 130 may comprise any computing devices capable of acting as a gateway between the wireless network and the other packet data networks, such as the Internet or SIP-based IMS networks. PGW 120 and SGW 130 may each include processing systems, user interfaces, communication interfaces, storage systems, or other similar computing elements. In particular, PGW 120 may include elements to provide communication services to wireless devices based on quota information provided by OCS 110.

Wireless network 140 is configured to provide communication services to various wireless devices using Long Term Evolution (LTE), Code Division Multiple Access (CDMA), Evolution Data Only (EVDO) or some other wireless communication format. Wireless network 110 may comprise switches, access nodes, Internet routers, network gateways, application servers, computer systems, communication links, or some other type of communication equipment—including combinations thereof.

Communication links 150-152 use metal, glass, air, space, or some other material as the transport media. Communication links 150-152 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 150-152 could be direct links or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method of operating a packet data network gateway to implement default quotas from an online charging server, the method comprising:
   transferring a quota request for delivery to the online charging server in response to a communication requirement for a wireless device;
   receiving default quota information and actual quota information from the online charging server regarding the wireless device;
   implementing the actual quota information for the wireless device;
   identifying a communication interruption between the packet data network gateway and the online charging server;
   identifying that the actual quota information for the wireless device is exhausted; and
   in response to the communication interruption and the exhaustion of the actual quota information, implementing the default quota information for the wireless device.

2. The method of claim 1 wherein the actual quota information comprises a portion of the total data available to the wireless device.

3. The method of claim 1 wherein transferring the quota request comprises transferring the quota request using a Gy interface.

4. The method of claim 1 wherein the default quota information comprises default data allocations based on a quality of service for the wireless device.

5. The method of claim 1 wherein the default quota information comprises default data allocations for the wireless device for one or more periods of time.

6. The method of claim 1 further comprising:
   identifying a reestablishment in communication between the packet data network gateway and the online charging server; and
   in response to the reestablishment, receiving new actual quota information for the wireless device.

7. The method of claim 6 further comprising:
   transferring data usage information to the online charging server indicating an amount of data used by the wireless device during the interruption.

8. A system for default data quota implementation comprising:
   a packet data network gateway configured to:

transfer a quota request for delivery to an online charging server in response to a communication requirement for a wireless device;
receive default quota information and actual quota information from the online charging server regarding the wireless device;
implement the actual quota information for the wireless device;
identify a communication interruption between the packet data network gateway and the online charging server;
identify that the actual quota information for the wireless device is exhausted; and
in response to the communication interruption and the exhaustion of the actual quota information, implement the default quota information for the wireless device; and the online charging server configured to:
receive the quota request;
identify the default quota information and the actual quota information; and
transfer the default quota information and the actual quota information for delivery to the packet data network gateway.

9. The system of claim 8 wherein the actual quota information comprises a portion of the total data available to the wireless device.

10. The system of claim 8 wherein the packet data network gateway configured to transfer the quota request is configured to transfer the quota request using a Gy interface.

11. The system of claim 8 wherein the default quota information comprises default data allocations based on a quality of service for the wireless device.

12. The system of claim 8 wherein the default quota information comprises default data allocations for the wireless device for one or more periods of time.

13. The system of claim 8 wherein the packet data network gateway is further configured to:
identify a reestablishment in communication between the packet data network gateway and the online charging server; and
in response to the reestablishment, determine new actual quota information for the wireless device.

14. The system of claim 13 wherein the packet data network gateway is further configured to:
transfer data usage information to the online charging server indicating an amount of data used by the wireless device during the interruption.

15. A computer apparatus to facilitate default quota implementation, the computer apparatus comprising:
processing instructions that direct a packet data network gateway (PGW) computing system, when executed by the PGW computing system, to:
transfer a quota request for delivery to an online charging server in response to a communication requirement for a wireless device;
receive default quota information and actual quota information from the online charging server regarding the wireless device;
implement the actual quota information for the wireless device;
identify a communication interruption between the packet data network gateway and the online charging server;
identify that the actual quota information for the wireless device is exhausted; and
in response to the communication interruption and the exhaustion of the actual quota information, implement the default quota information for the wireless device;
one or more non-transitory computer readable media that store the processing instructions.

16. The computer apparatus of claim 15 wherein the actual quota information comprises a portion of the total data available to the wireless device and the default quota information comprises default data allocations for the wireless device for one or more periods of time based on a quality of service.

* * * * *